US012600137B2

(12) United States Patent
Numajiri

(10) Patent No.: US 12,600,137 B2
(45) Date of Patent: Apr. 14, 2026

(54) LIQUID EJECTING DEVICE

(71) Applicant: SEIKO EPSON CORPORATION, Tokyo (JP)

(72) Inventor: Tomohiro Numajiri, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 18/477,261

(22) Filed: Sep. 28, 2023

(65) Prior Publication Data

US 2024/0109324 A1 Apr. 4, 2024

(30) Foreign Application Priority Data

Sep. 29, 2022 (JP) ................................ 2022-155979

(51) Int. Cl.
*B41J 2/165* (2006.01)
*B41J 11/00* (2006.01)

(52) U.S. Cl.
CPC ....... *B41J 2/16535* (2013.01); *B41J 2/16526* (2013.01); *B41J 11/00222* (2021.01); *B41J 2/16502* (2024.05); *B41J 2002/1655* (2013.01); *B41J 2002/16594* (2013.01)

(58) Field of Classification Search
CPC ......................... B41J 2/16535; B41J 2/16526; B41J 2/16502; B41J 2002/16594; B41J 11/00222; B41M 7/009
USPC .............................................. 347/29, 31, 33
See application file for complete search history.

(56) References Cited

U.S. PATENT DOCUMENTS

| | | | | |
|---|---|---|---|---|
| 2013/0257943 | A1* | 10/2013 | Toya | B41J 15/02 347/9 |
| 2016/0375702 | A1* | 12/2016 | Kobashi | B41J 11/002 347/33 |
| 2018/0086054 | A1* | 3/2018 | Abe | B41J 2/04541 |
| 2020/0298593 | A1* | 9/2020 | Ohnishi | B41J 11/002 |
| 2022/0242128 | A1* | 8/2022 | Sato | B41J 2/16517 |

FOREIGN PATENT DOCUMENTS

| | | | |
|---|---|---|---|
| JP | H04-286655 | A | 10/1992 |
| JP | 2007-130784 | A | 5/2007 |
| JP | 2009-247923 | A | 10/2009 |

* cited by examiner

*Primary Examiner* — Stephen D Meier
*Assistant Examiner* — Thomas Ray Knief
(74) *Attorney, Agent, or Firm* — WORKMAN NYDEGGER

(57) ABSTRACT

A liquid ejecting device includes an ejecting unit that includes a nozzle surface at which at least one nozzle is open and that ejects a liquid onto a medium from the at least one nozzle, a carriage that is mounted with the ejecting unit and that reciprocates in a scanning direction, a drying unit that is mounted at the carriage and that dries the liquid ejected onto the medium by the ejecting unit, and a receiving unit that receives the liquid discharged from the at least one nozzle as a result of a maintenance operation for the ejecting unit. The receiving unit includes an absorbing member that absorbs the liquid. The drying unit dries the absorbing member when the ejecting unit is positioned, during printing, at a stop position at which the ejecting unit stops.

16 Claims, 5 Drawing Sheets

LIQUID EJECTING DEVICE

The present application is based on and claims priority from JP Application Serial Number 2022-155979, filed Sep. 29, 2022, the disclosure of which is hereby incorporated by reference herein in its entirety.

BACKGROUND

1. Technical Field

The present disclosure relates to a liquid ejecting device.

2. Related Art

JP-A-2009-247923 describes a liquid ejecting device including an ejecting unit that ejects a liquid, and a receiving unit that receives the liquid discharged from the ejecting unit. The receiving unit includes an absorbing member that absorbs the liquid. The absorbing member absorbs the liquid discharged from the ejecting unit to the receiving unit as a result of a maintenance operation, such as a flushing operation and a cleaning operation.

In the liquid ejecting device described in JP-A-2009-247923, the absorbing member is consumed as a result of the maintenance operation for the ejecting unit. Thus, for example, when a frequency of the maintenance operation increases, there is a risk that a consumed amount of the absorbing member may increase.

SUMMARY

A liquid ejecting device for solving the problem described above includes an ejecting unit including a nozzle surface at which at least one nozzle is open, the ejecting unit being configured to perform printing on a medium by ejecting a liquid onto the medium from the at least one nozzle, a carriage mounted with the ejecting unit and configured to reciprocate in a scanning direction, a drying unit mounted at the carriage and configured to dry the liquid ejected onto the medium by the ejecting unit, and a receiving unit configured to receive the liquid discharged from the at least one nozzle as a result of a maintenance operation for the ejecting unit. The receiving unit includes an absorbing member configured to absorb the liquid, and the drying unit dries the absorbing member when the ejecting unit is positioned, during the printing, at a stop position at which the ejecting unit stops.

DESCRIPTION OF EMBODIMENTS

With reference to the drawings, an embodiment of a liquid ejecting device will be described below. The liquid ejecting device is, for example, an ink jet-type printer that performs printing of an image such as characters and photographs on a medium such as a sheet and fabric by ejecting ink, which is an example of a liquid.

Liquid Ejecting Device

Figure 1:
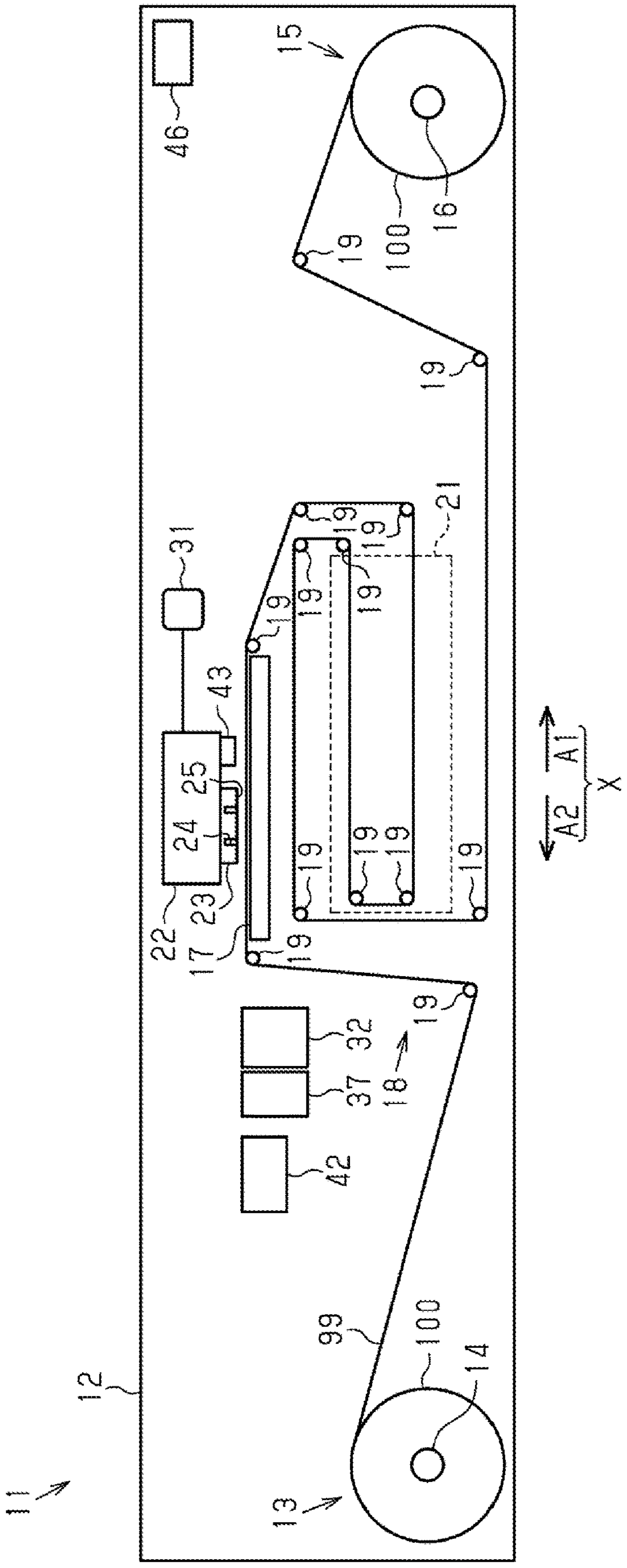
FIG. 1 is a side view illustrating an embodiment of a liquid ejecting device.

As illustrated in FIG. 1, the liquid ejecting device 11 includes a housing 12.

The liquid ejecting device 11 includes a feeding unit 13. The feeding unit 13 is configured to feed a medium 99. The feeding unit 13 is accommodated in the housing 12, for example. The feeding unit 13 includes a feeding shaft 14. The feeding shaft 14 rotatably holds a roll body 100 around which the medium 99 is wound. The feeding shaft 14 holds the medium 99 before printing. As the feeding shaft 14 rotates, the medium 99 is fed from the feeding unit 13. The feeding shaft 14 may be driven to rotate by a motor, or may be driven to rotate by the medium 99 being pulled.

The liquid ejecting device 11 includes a winding unit 15. The winding unit 15 is configured to wind the medium 99. The winding unit 15 is accommodated in the housing 12, for example. The winding unit 15 includes a winding shaft 16. Similarly to the feeding shaft 14, the winding shaft 16 rotatably holds the roll body 100. The winding shaft 16 holds the medium 99 after the printing. As the winding shaft 16 rotates, the winding unit 15 winds the medium 99. The winding shaft 16 is driven to rotate by a motor, for example.

The liquid ejecting device 11 includes a support portion 17. The support portion 17 supports the medium 99. The support portion 17 is accommodated in the housing 12, for example. The support portion 17 supports the medium 99 from below, for example. The support portion 17 supports the medium 99 in the course of the medium 99 being fed from the feeding unit 13 to being wound by the winding unit 15. Printing is performed on a region of the medium 99 supported by the support portion 17.

The liquid ejecting device 11 includes a transport unit 18. The transport unit 18 is configured to transport the medium 99. The transport unit 18 is accommodated in the housing 12, for example. The transport unit 18 transports the medium 99 from the feeding unit 13 toward the winding unit 15. The transport unit 18 transports the medium 99 on the support portion 17 in a first direction A1, for example. For example, the transport unit 18 intermittently transports the medium 99. Specifically, the transport unit 18 stops while the liquid is being ejected onto the region of the medium 99 supported by the support portion 17. The transport unit 18 transports the medium 99 after the liquid has been ejected onto the region of the medium 99 supported by the support portion 17. The transport unit 18 is not limited to transporting the long medium 99 in a continuous manner from the roll body 100, and may transport the medium 99 in a single-cut form.

For example, the transport unit 18 includes one or more transport rollers 19. For example, the transport roller 19 is located in the housing 12, for example. The transport roller 19 rotates to transport the medium 99. The medium 99 is wound over the transport roller 19. The transport rollers 19 may sandwich the medium 99. The transport roller 19 rotates to transport the medium 99. The transport roller 19 includes, for example, a roller that is driven to rotate by a motor. A transport path of the medium 99 is formed in the housing 12 by the transport roller 19.

The liquid ejecting device 11 may include a main drying unit 21. The main drying unit 21 is configured to dry the medium 99 after the printing. The main drying unit 21 dries the medium 99 in the course of the medium 99 being transported from the support portion 17 to the winding unit 15. The main drying unit 21 is located in the housing 12, for example. The main drying unit 21 is located, for example, immediately below the support portion 17. The main drying unit 21 is, for example, a drying furnace into which the medium 99 transported by the transport unit 18 enters. The main drying unit 21 may include a heater that heats the medium 99. The main drying unit 21 may include a blower that blows gas onto the medium 99.

The liquid ejecting device 11 includes a carriage 22. The carriage 22 is configured to reciprocate in a scanning direction X. The carriage 22 passes through a position facing the support portion 17 by reciprocating in the scanning direction X. The carriage 22 is located, for example, above the support portion 17.

The scanning direction X includes the first direction A1 and a second direction A2. The second direction A2 is a direction opposite from the first direction A1. In the liquid ejecting device 11, the direction in which the carriage 22 moves coincides with the direction in which the medium 99 moves on the support portion 17. Thus, the liquid ejecting device 11 is a lateral printer. The liquid ejecting device 11 may be a serial printer in which the medium 99 is transported in a direction different from the scanning direction X.

Figure 2:
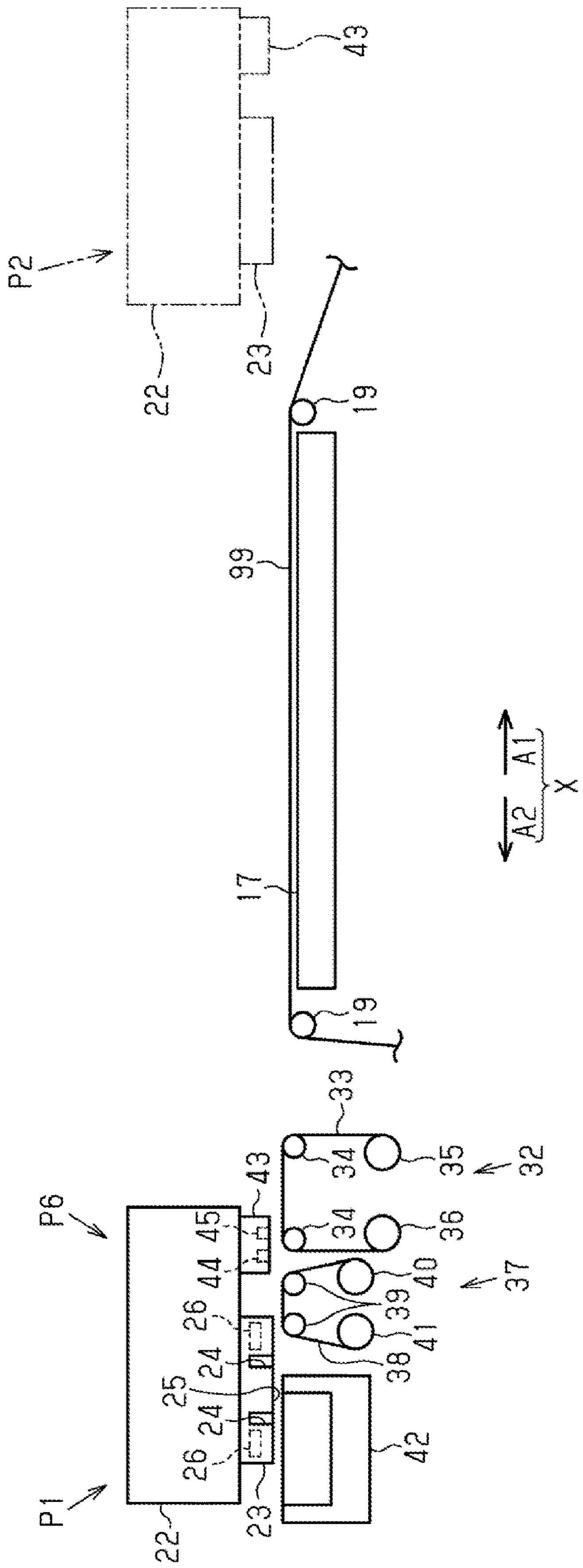
FIG. 2 is a side view of the liquid ejecting device illustrating a first turn-back position and a second turn-back position.

As illustrated in FIG. 2, the liquid ejecting device 11 includes an ejecting unit 23. The ejecting unit 23 is mounted at the carriage 22. The ejecting unit 23 is configured to eject a liquid onto the medium 99. The ejecting unit 23 ejects the liquid onto the medium 99 to perform printing on the medium 99. The ejecting unit 23 includes a nozzle surface 25 at which one or more nozzles 24 are open. The ejecting unit 23 ejects the liquid from the nozzle 24.

The ejecting unit 23 includes one or more piezoelectric elements 26. The ejecting unit 23 includes the same number of the piezoelectric elements 26 as of the nozzles 24. The piezoelectric element 26 changes the pressure in the nozzle 24 in accordance with a voltage applied thereto. When the piezoelectric element 26 changes the pressure in the nozzle 24, the liquid is ejected from the nozzle 24.

The piezoelectric element 26 can change the pressure in the nozzle 24 while not causing the liquid to be ejected from the nozzle 24. In other words, by changing the pressure in the nozzle 24, the piezoelectric element 26 can vibrate the liquid in the nozzle 24 while not causing the liquid to be ejected from the nozzle 24. In this manner, the ejecting unit 23 can perform micro-vibrations for vibrating the liquid in the nozzle 24. The liquid in the nozzle 24 is stirred by the micro-vibrations. As a result, thickening of the liquid inside the nozzle 24 is resolved. The ejecting unit 23 performs the micro-vibrations as appropriate, for example, before the printing, during the printing, or the like. The micro-vibrations are performed in a state in which the ejecting unit 23 is stopped.

The ejecting unit 23 ejects the liquid onto the region of the medium 99 supported by the support portion 17. The ejecting unit 23 is a line head capable of ejecting the liquid simultaneously over the entire width of the medium 99. The ejecting unit 23 reciprocates in the scanning direction X together with the carriage 22. In this manner, the ejecting unit 23 can eject the liquid over the entire region, of the medium 99, supported by the support portion 17.

The ejecting unit 23 is displaced to a plurality of positions by moving in the scanning direction X. The ejecting unit 23 is displaced not only to the position facing the support portion 17, but also to a position not facing the support portion 17. The ejecting unit 23 is displaced to a first turn-back position P1 and a second turning-back position P2. The first turn-back position P1 and the second turn-back position P2 are positions at which the carriage 22 turns back. The ejecting unit 23 may reciprocate between the first turn-back position P1 and the second turn-back position P2 during the printing, or may reciprocate between the first turn-back position P1 and the second turn-back position P2 during another operation different from the printing.

The first turn-back position P1 is, for example, a position shifted in the second direction A2 from the position facing the support portion 17. The second turn-back position P2 is, for example, a position shifted in the first direction A1 from the position facing the support portion 17. In FIG. 2, the first turn-back position P1 is a position of the ejecting unit 23 indicated by the solid line. In FIG. 2, the second turn-back position P2 is a position of the ejecting unit 23 indicated by the alternate long and short dash line.

When the ejecting unit 23 reciprocates, the moving direction of the ejecting unit 23 is switched between the first direction A1 and the second direction A2. For example, the moving direction of the ejecting unit 23 is switched after the ejecting unit 23 has passed through the region facing the support portion 17. At this time, the carriage 22 turns back from the first direction A1 to the second direction A2, or from the second direction A2 to the first direction A1. When the carriage 22 turns back from the first direction A1 to the second direction A2, and when the carriage 22 turns back from the second direction A2 to the first direction A1, the ejecting unit 23 temporarily stops. Therefore, during the printing, the first turn-back position P1 and the second turn-back position P2 are positions at which the ejecting unit 23 stops to turn back.

At the first turn-back position P1, the ejecting unit 23 stops to turn back from the second direction A2 to the first direction A1. At the second turn-back position P2, the ejecting unit 23 stops to turn back from the first direction A1 to the second direction A2. When starting the printing, the ejecting unit 23 may stand by at the first turn-back position P1. In this case, the first turn-back position P1 is also a standby position before the printing.

Figure 3:
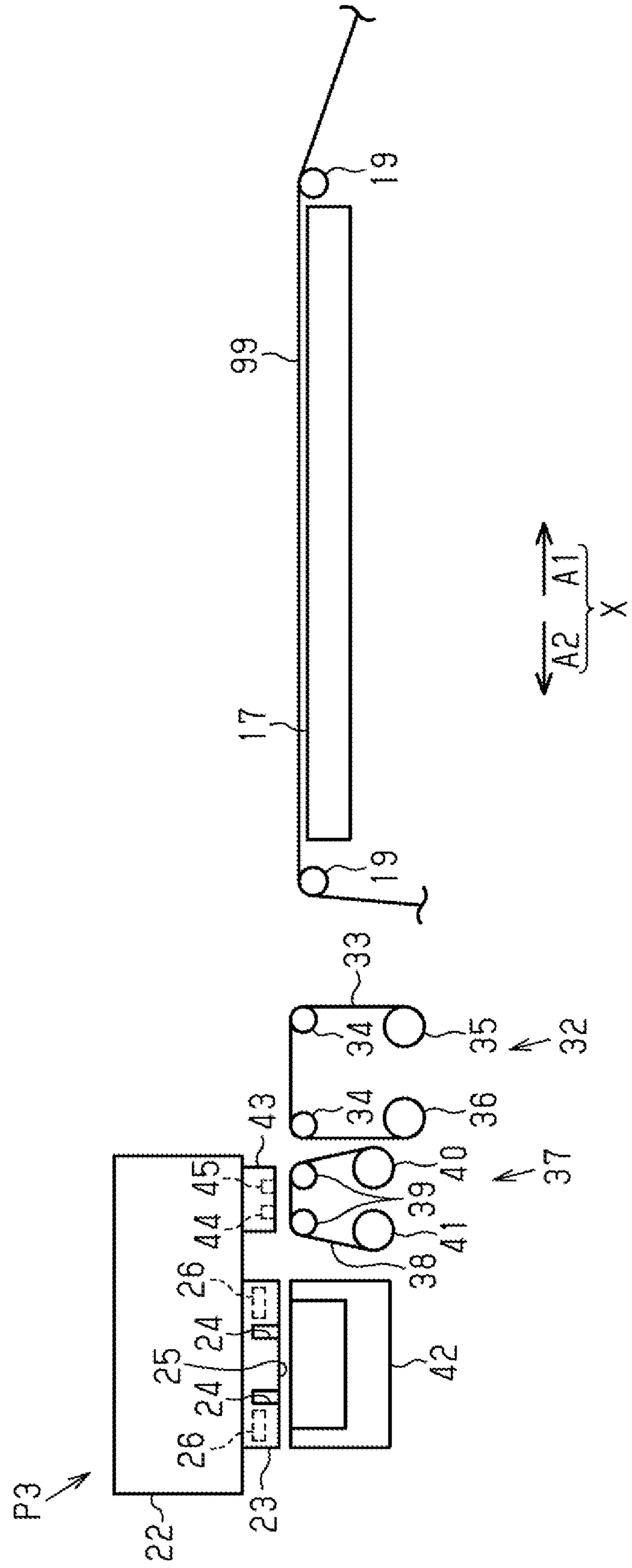
FIG. 3 is a side view of the liquid ejecting device illustrating a retracted position.

As illustrated in FIG. 3, the ejecting unit 23 is displaced to a retracted position P3. The retracted position P3 is a position at which the ejecting unit 23 stops when the printing is not being performed, such as when standing by while waiting for print data to be input, for example. When the printing is not being performed, the ejecting unit 23 stands by at the retracted position P3. In other words, the retracted position P3 is a home position of the ejecting unit 23. The retracted position P3 is, for example, a position shifted in the second direction A2 from the position facing the support portion 17. In one example, the retracted position P3 is a position shifted from the first turn-back position P1 in the second direction A2. When the printing is started, for example, when the print data is input, the ejecting unit 23 is displaced from the retracted position P3 to the first turn-back position P1.

Figure 4:
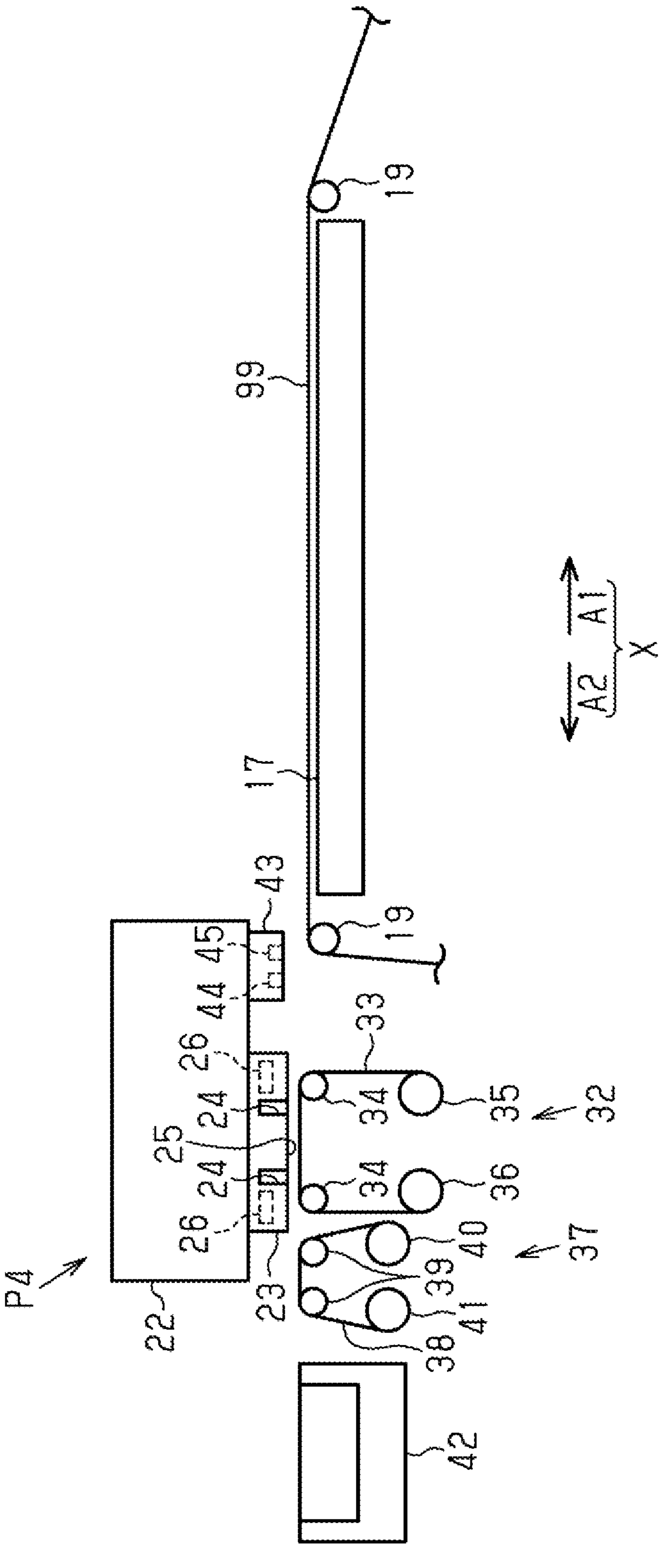
FIG. 4 is a side view of the liquid ejecting device illustrating a discharge position.

As illustrated in FIG. 4, the ejecting unit 23 is displaced to a discharge position P4. The discharge position P4 is a position at which the liquid is discharged from the nozzle 24 as a result of a maintenance operation for the ejecting unit 23. As a result of the maintenance operation, air bubbles, a foreign material, and the like are discharged together with the liquid from the nozzle 24. The discharge position P4 is, for example, a position shifted in the second direction A2 from the position facing the support portion 17. In one example, the discharge position P4 is a position shifted from the first turn-back position P1 in the first direction A1. In this case, the ejecting unit 23 can pass through the discharge position P4 by reciprocating between the first turn-back position P1 and the second turn-back position P2. Therefore, during the printing, the ejecting unit 23 can smoothly perform the maintenance operation at the discharge position P4.

Figure 5:
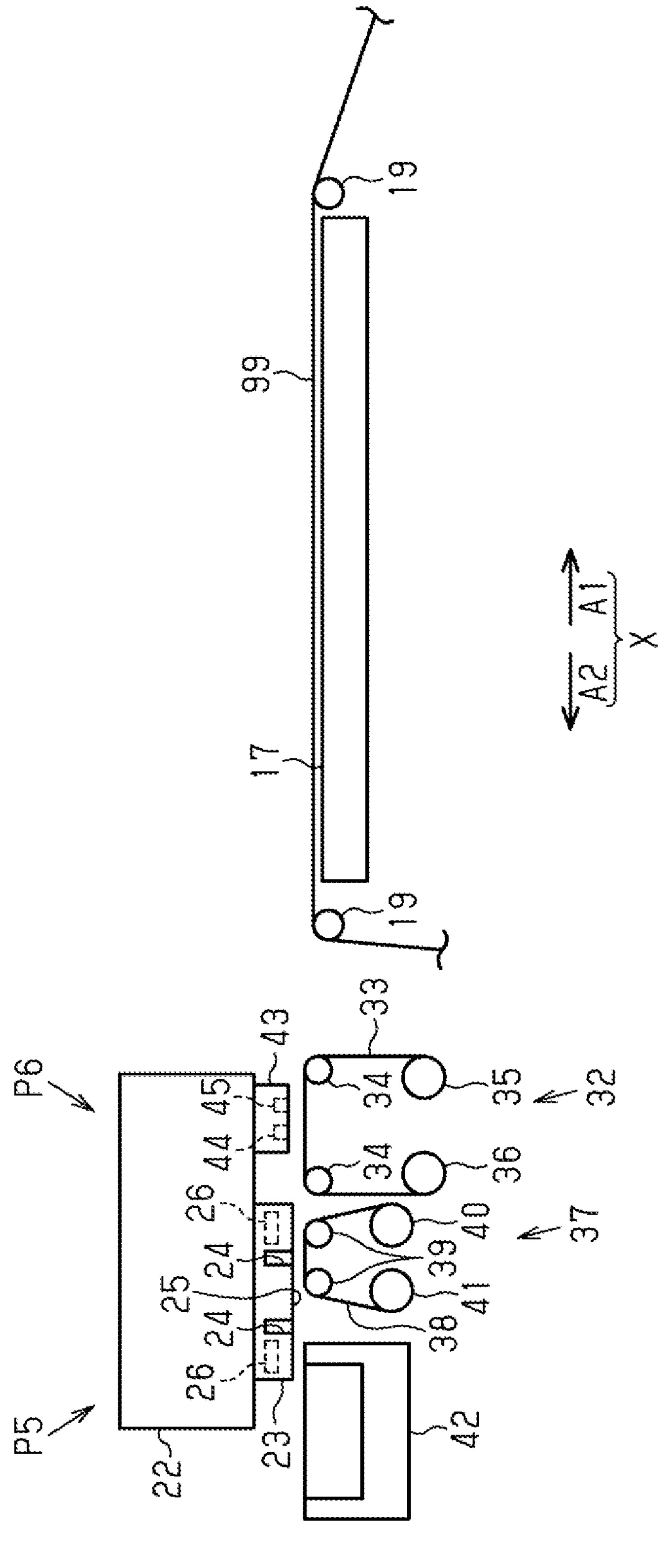
FIG. 5 is a side view of the liquid ejecting device illustrating a removal position.

As illustrated in FIG. 5, the ejecting unit 23 is displaced to a removal position P5. The removal position P5 is a position at which the liquid adhering to the nozzle surface 25 is removed. The removal position P5 is, for example, a position shifted in the second direction A2 from the position facing the support portion 17. In one example, the removal position P5 is a position between the first turn-back position P1 and the discharge position P4 in the scanning direction X.

The ejecting unit 23 is displaced to a stop position P6. The stop position P6 is a position at which the ejecting unit 23 stops during the printing. The number of stop positions P6 may be one or more. The stop position P6 will be described again later.

As illustrated in FIG. 1, the liquid ejecting device 11 includes a pressurizing unit 31. The pressurizing unit 31 is configured to increase the pressure inside the ejecting unit 23. The pressurizing unit 31 is coupled to the ejecting unit 23. The pressurizing unit 31 is, for example, a pump. The pressurizing unit 31 increases the pressure inside the ejecting unit 23 to forcibly discharge the liquid from the nozzle 24. In other words, the pressurizing unit 31 increases the pressure inside the ejecting unit 23 to cause the ejecting unit 23 to perform a cleaning operation. The cleaning operation is a maintenance operation in which the air bubbles, the foreign material, and the like are discharged from the nozzle 24 together with the liquid in the ejecting unit 23, by forcibly discharging the liquid from the nozzle 24. Therefore, the pressurizing unit 31 causes the ejecting unit 23 to perform the cleaning operation as the maintenance operation.

As illustrated in FIG. 2, FIG. 3, FIG. 4, and FIG. 5, the liquid ejecting device 11 includes a receiving unit 32. The receiving unit 32 receives the liquid discharged from the nozzle 24 by the maintenance operation. When the ejecting unit 23 performs the maintenance operation, the receiving unit 32 receives the liquid discharged from the nozzle 24.

The receiving portion 32 receives, for example, the liquid discharged from the nozzle 24 by the cleaning operation. The receiving portion 32 receives the liquid discharged from the nozzles 24 not only by the cleaning operation, but also by a flushing operation, for example. The flushing operation is a maintenance operation in which the liquid is ejected from the nozzle 24 in order to inhibit the nozzle 24 from becoming clogged. For example, the flushing operation causes the liquid that has thickened to be discharged from the nozzle 24. The flushing operation is performed by applying a voltage to the piezoelectric element 26. Thus, the receiving portion 32 may receive the liquid discharged by the cleaning operation as the maintenance operation, or may receive the liquid discharged by the flushing operation as the maintenance operation. The amount of liquid discharged to the receiving portion 32 by the flushing operation is smaller than the amount of liquid discharged to the receiving portion 32 by the cleaning operation.

The receiving portion 32 is arranged side by side with the support portion 17 in the scanning direction X, for example. In one example, the receiving portion 32 is positioned in the second direction A2 with respect to the support portion 17. The receiving portion 32 receives the liquid discharged from the ejecting unit 23 when the ejecting unit 23 is positioned at a position facing the receiving portion 32. Specifically, the receiving unit 32 receives the liquid discharged from the ejecting unit 23 when the ejecting unit 23 is positioned at the discharge position P4. The discharge position P4 is a position at which the ejecting unit 23 faces the receiving unit 32.

The flushing operation is performed before the printing in a state in which the ejecting unit 23 is stopped at the discharge position P4. The flushing operation is performed during the printing in a state in which the ejecting unit 23 is moving in the first direction A1. In other words, the flushing operation is performed during the printing while the ejecting unit 23 is passing through the discharge position P4. The cleaning operation is performed in the state in which the ejecting unit 23 is stopped at the discharge position P4.

The receiving portion 32 includes an absorbing member 33. The absorbing member 33 is a member that absorbs the liquid. The absorbing member 33 is, for example, a cloth. The absorbing member 33 receives the liquid discharged from the nozzle 24, and absorbs the liquid.

The receiving unit 32 includes, for example, two holding rollers 34. The absorbing member 33 is wound over the two holding rollers 34. In other words, the absorbing member 33 is stretched over the two holding rollers 34. In this manner, the two holding rollers 34 hold the absorbing member 33. Since the two holding rollers 34 hold the absorbing member 33, a region facing the nozzle surface 25 is formed at the absorbing member 33. The absorbing member 33 receives the liquid in this region.

The receiving unit 32 includes, for example, a supply roller 35 and a collection roller 36. The supply roller 35 is a roller that supplies the unused absorbing member 33. The collecting roller 36 is a roller that collects the used absorbing member 33. For example, each time the absorbing member 33 receives a certain amount of the liquid, the supply roller 35 and the collection roller 36 rotate.

The liquid ejecting device 11 includes a wiping unit 37. The wiping unit 37 comes into contact with the nozzle surface 25 to wipe the nozzle surface 25. The wiping unit 37 wipes the nozzle surface 25 to remove the liquid adhering to the nozzle surface 25. In other words, the wiping unit 37 performs wiping on the ejecting unit 23. The wiping unit 37 wipes the nozzle surface 25, for example, after the cleaning operation. When the cleaning operation is performed, as a result of the liquid being discharged from the nozzle 24, the liquid adheres to the nozzle surface 25. Thus, the wiping unit 37 may wipe the nozzle surface 25 after the cleaning operation. In this manner, the liquid adhering to the nozzle surface 25 is removed.

The wiping unit 37 is arranged side by side with the receiving unit 32 in the scanning direction X, for example. In one example, the wiping unit 37 is positioned at a position shifted from the receiving portion 32 in the second direction A2. For example, when the ejecting unit 23 is positioned at a position facing the wiping unit 37, the wiping unit 37 comes into contact with the nozzle surface 25 by approaching the ejecting unit 23. Specifically, when the ejecting unit 23 is positioned at the removal position P5, the wiping unit 37 comes into contact with the nozzle surface 25 by approaching the ejecting unit 23. The removal position P5 is a position at which the ejecting unit 23 faces the wiping unit 37. The wiping portion 37 may come into contact with the nozzle surface 25 by the ejecting unit 23 approaching the wiping portion 37. The wiping unit 37 wipes the nozzle surface 25 by moving relative to the ejecting unit 23 in a state of being in contact with the nozzle surface 25.

The wiping unit 37 includes a wiping member 38. The wiping member 38 is a member that comes into contact with the nozzle surface 25. The wiping member 38 is, for example, a cloth. The liquid is removed from the nozzle surface 25 by the wiping member 38 absorbing the liquid adhering to the nozzle surface 25.

For example, the wiping unit 37 includes one or more pressing rollers 39. The pressing roller 39 is a roller that presses the wiping member 38 against the nozzle surface 25. In this manner, the wiping member 38 can be brought into close contact with the nozzle surface 25.

The wiping unit 37 includes, for example, a feeding roller 40 and a winding roller 41. The feeding roller 40 is a roller that feeds the unused wiping member 38. The winding roller 41 is a roller that winds the used wiping member 38. For example, each time the wiping member 38 wipes the nozzle surface 25 a predetermined number of times, the feeding roller 40 and the winding roller 41 rotate.

The liquid ejecting device 11 includes a contact portion 42. The contact portion 42 comes into contact with the nozzle surface 25 to keep the nozzle 24 moisturized. For example, the contact portion 42 is a cap. The contact portion 42 comes into contact with the nozzle surface 25 to form a space communicating with the nozzle 24. In other words, the contact portion 42 performs capping on the ejecting unit 23. The nozzle 24 is kept moisturized by the capping. As a result, a risk of the nozzle 24 becoming clogged is reduced.

For example, the contact portion 42 is arranged side by side with the wiping unit 37 in the scanning direction X. In one example, the contact portion 42 is positioned at a position shifted from the wiping unit 37 in the second direction A2. For example, when the ejecting unit 23 is positioned at a position facing the contact portion 42, the contact portion 42 comes into contact with the nozzle surface 25 by approaching the ejecting unit 23. Specifically, when the ejecting unit 23 is positioned at the retracted position P3, the contact portion 42 comes into contact with the nozzle surface 25 by approaching the ejecting unit 23. The retraction position P3 is a position at which the ejecting unit 23 faces the contact portion 42. The contact portion 42 may come into contact with the nozzle surface 25 by the ejecting unit 23 approaching the contact portion 42.

The liquid ejecting device 11 includes a drying unit 43. The drying unit 43 is mounted at the carriage 22. The drying unit 43 is arranged side by side with the ejecting unit 23 in the scanning direction X, for example. In one example, the drying unit 43 is positioned at a position shifted from the ejecting unit 23 in the first direction A1. The drying unit 43 dries the liquid ejected onto the medium 99 by the ejecting unit 23. Specifically, the drying unit 43 dries the region of the medium 99 supported by the support portion 17.

The drying unit 43 dries the medium 99 by approaching the medium 99 supported by the support portion 17. For example, during the printing, the drying unit 43 is moved to the position facing the support portion 17 by the carriage 22. At this time, the drying unit 43 dries the liquid adhering to the medium 99 at the same time as the ejecting unit 23 ejecting the liquid onto the medium 99.

The drying unit 43 may include an air blowing unit 44. The air blowing unit 44 is configured to blow air onto the medium 99. The air blowing unit 44 is, for example, a fan. The air blowing unit 44 blows the air onto the medium 99 to dry the medium 99. In one example, the air blowing unit 44 blows the air diagonally downward in the first direction A1. The air blowing unit 44 may blow the air directly downward, or may blow the air diagonally downward toward the second direction A2.

The air blowing unit 44 may be configured to change an air blowing amount. For example, as the number of revolutions of the fan increases, the air blowing amount increases. In this manner, the drying performance of the air blowing unit 44 is changed.

The air blowing unit 44 may be configured to change an air blowing direction. The air blowing direction is a direction in which the air is blown by the air blowing unit 44. The drying unit 43 may change the air blowing direction, for example, by changing the orientation of the air blowing unit 44. For example, the drying unit 43 may change the air blowing direction according to the movement of the carriage 22, so as to cause the air blowing unit 44 to blow the air toward the medium 99 supported by the support portion 17.

The drying unit 43 may include a heating unit 45. The heating unit 45 is configured to heat the medium 99. The heat unit 45 is, for example, an infrared heater. The heating unit 45 heats the medium 99 to dry the medium 99. In one example, the heating unit 45 heats a region immediately below the heating unit 45. The heating unit 45 may heat a region diagonally downward in the first direction A1, or may heat a region diagonally downward in the second direction A2.

The heating unit 45 may be configured to change a heating amount. For example, as the temperature of the infrared heater increases, the heating amount increases. In this manner, the drying performance of the heating unit 45 is changed.

The heating unit 45 may be configured to change a heating direction. The heating direction is a direction in which the heating effect by the heating unit 45 extends, for example, a direction in which an infrared ray is emitted. The drying unit 43 may change the heating direction, for example, by changing the orientation of the heating unit 45. For example, the drying unit 43 may change the heating direction according to the movement of the carriage 22, so as to cause the heating unit 45 to emit the infrared ray toward the medium 99 supported by the support portion 17.

The drying unit 43 dries not only the medium 99, but also the absorbing member 33. The absorbing member 33 is consumed by performing the maintenance operation of the ejecting unit 23. Thus, when the maintenance operation for the ejecting unit 23 is performed more frequently, a consumed amount of the absorbing member 33 is increased. In this regard, when the drying unit 43 dries the absorbing member 33, the amount of liquid that can be absorbed by the absorbing member 33 increases. In this manner, the consumed amount of the absorbing member 33 is reduced. Further, since the absorbing member 33 is dried by the drying unit 43 that dries the medium 99, it is not necessary to separately provide a configuration for drying the absorbing member 33.

The drying unit 43 dries the absorbing member 33 when the ejecting unit 23 stops at the stop position P6. When the ejecting unit 23 is positioned at the stop position P6, it can be said that the receiving unit 32 is positioned in a region to which the drying effect by the drying unit 43 extends. For example, when the ejecting unit 23 stops at the stop position P6, the air blowing unit 44 blows the air onto the absorbing member 33. For example, when the ejecting unit 23 stops at the stop position P6, the heating unit 45 heats the absorbing member 33.

When the ejecting unit 23 is positioned at the stop position P6, the drying unit 43 may be positioned at a position facing the receiving unit 32. When the ejecting unit 23 is positioned at the stop position P6, the drying unit 43 may change the air blowing direction of the air blowing unit 44 to be directed toward the absorbing member 33, or may change the heating direction of the heating unit 45 to be directed toward the receiving unit 32. In this manner, the drying unit 43 dries the absorbing member 33 while the ejecting unit 23 is stopped at the stop position P6. When the ejecting unit 23 stops at the stop position P6, the heating unit 45 may be positioned immediately above the absorbing member 33. In this case, the heating unit 45 can effectively dry the absorbing member 33. When the ejecting unit 23 stops at the stop position P6, the air blowing unit 44 may be positioned immediately above the absorbing member 33.

The drying unit 43 may dry the absorbing member 33 when the ejecting unit 23 is positioned at the retracted position P3. When the ejecting unit 23 is positioned at the retracted position P3, the receiving unit 32 may be positioned in the region to which the drying effect by the drying unit 43 extends. For example, when the ejecting unit 23 is positioned at the retracted position P3, the drying unit 43 may be positioned to face the absorbing member 33. When the ejecting unit 23 is positioned at the retracted position P3, the air blowing direction of the air blowing unit 44 may be changed to be directed toward the absorbing member 33, or the heating direction of the heating unit 45 may be changed to be directed toward the absorbing member 33. In this manner, the drying unit 43 can dry the absorbing member 33 at the same time as the capping being performed on the ejecting unit 23.

The drying unit 43 may change the drying performance with respect to the absorbing member 33, based on the amount of liquid discharged to the receiving unit 32. For example, the larger the amount of liquid discharged to the receiving unit 32 is, the more the drying unit 43 may increase the air blowing amount of the air blowing unit 44, or the more the drying unit 43 may increase the temperature of the heating unit 45. In this manner, the larger the amount of liquid discharged to the receiving unit 32 is, the more the drying of the absorbing member 33 is boosted.

Compared to when the ejecting unit 23 stops at the stop position P6 after performing the flushing operation, when the ejecting unit 23 stops at the stop position P6 after performing the cleaning operation, the drying unit 43 may increase the air blowing amount of the air blowing unit 44. Compared to when the ejecting unit 23 stops at the stop position P6 after performing the flushing operation, when the ejecting unit 23 stops at the stop position P6 after performing the cleaning operation, the drying unit 43 may increase the temperature of the heating unit 45. In this manner, after the cleaning operation has been performed in which a larger amount of the liquid is discharged, the drying unit 43 can effectively dry the absorbing member 33.

As illustrated in FIG. 1, the liquid ejecting device 11 includes a control unit 46. The control unit 46 controls the liquid ejecting device 11. The control unit 46 controls, for example, the feeding unit 13, the winding unit 15, the transport unit 18, the main drying unit 21, the carriage 22, the ejecting unit 23, the pressurizing unit 31, the receiving unit 32, the wiping unit 37, the contact portion 42, the drying unit 43, and the like. The control unit 46 controls the change of the region to which the drying effect by the drying unit 43 extends, the change of the drying performance, and the like.

The control unit 46 may be constituted by one or more processors that execute various types of processing according to a computer program. The control unit 46 may be constituted by one or more dedicated hardware circuits, such as an application specific integrated circuit, that execute at least a part of the various types of processing. The control unit 46 may be constituted by a circuit including a combination of a processor and a hardware circuit. The processor includes a CPU and a memory such as a RAM and a ROM. The memory stores program codes or commands configured to cause the CPU to execute processing. The memory, that is, a computer-readable medium, includes any readable medium that can be accessed by a general purpose or special purpose computer.

Stop Position

Next, the stop position P6 will be described.

The ejecting unit 23 may temporarily stop during the printing. In this case, the ejecting unit 23 is positioned at the stop position P6. In other words, the drying unit 43 dries the absorbing member 33 at the same time as the ejecting unit 23 performing the printing. In this manner, the drying unit 43 can smoothly dry the absorbing member 33.

The stop position P6 is, for example, a position at which a distance between the drying unit 43 and the receiving unit 32 is smaller than when the ejecting unit 23 is positioned at the position facing the support portion 17. In other words, when the ejecting unit 23 is positioned at the stop position P6, the drying unit 43 is closer to the receiving unit 32 than when the ejecting unit 23 is positioned at the position facing the support portion 17. In this manner, the drying unit 43 can effectively dry the absorbing member 33 at the stop position P6.

For example, during the printing, the ejecting unit 23 may temporarily stop for specific processing. Thus, during the printing, the ejecting unit 23 may stop at the stop position P6 for the specific processing. Therefore, the drying unit 43 dries the absorbing member 33 at the same time as the specific processing being performed.

The specific processing is, for example, the generation of the micro-vibrations. It is necessary for the ejecting unit 23 to perform the micro-vibrations as appropriate during the printing. Thus, the ejecting unit 23 stands by at the stop position P6 in order to perform the micro-vibrations. When the generation of the micro-vibrations is completed, the ejecting unit 23 moves from the stop position P6.

The specific processing is not limited to the generation of the micro-vibrations, but may be processing of the print data. In the liquid ejecting device 11, during the printing, it sometimes takes time to process the print data. Thus, the ejecting unit 23 stands by at the stop position P6 in order to process the print data. When the processing of the print data is completed, the ejecting unit 23 moves from the stop position P6.

The specific processing is not limited to the generation of the micro-vibrations, and may be transport of the medium 99. In the liquid ejecting device 11, during the printing, it sometimes takes time for the transport of the medium 99 to be completed. Thus, the ejecting unit 23 stands by at the stop position P6 in order to transport the medium 99. For example, after ejecting the liquid onto the region of the medium 99 supported by the support portion 17, the ejecting unit 23 stands by at the stop position P6 until an unprinted portion of the medium 99 is positioned at the support portion 17. When the transport of the medium 99 is completed, the ejecting unit 23 moves from the stop position P6.

As illustrated in FIG. 2, the stop position P6 may be a position at which the carriage 22 turns back during the printing. In other words, the stop position P6 may coincide with the first turn-back position P1 or the second turn-back position P2. During the printing, the ejecting unit 23 stops at the first turn-back position P1 and the second turn-back position P2 to turn back. In this case, the drying unit 43 dries the absorbing member 33 by the ejecting unit 23 stopping at the first turn-back position P1 or the second turn-back position P2 to turn back. Further, when the stop position P6 coincides with the first turn-back position P1 or the second turn-back position P2, the ejecting unit 23 may stand by at the first turn-back position P1 or the second turn-back position P2 for the specific processing. In the example illustrated in FIG. 2, the stop position P6 coincides with the first turn-back position P1, for example. Therefore, when the ejecting unit 23 stops at the first turn-back position P1, the drying unit 43 dries the absorbing member 33. In this manner, the drying unit 43 can dry the absorbing member 33 at the same time as the carriage 22 turning back.

The stop position P6 is not limited to coinciding with the first turn-back position P1 or the second turn-back position P2, and may be a position different from the first turn-back position P1 and the second turn-back position P2. The stop position P6 may be, for example, a position between the first turn-back position P1 and the second turn-back position P2 in the scanning direction X. In this case, the ejecting unit 23 can pass through the stop position P6 by reciprocating between the first turn-back position P1 and the second turn-back position P2. Therefore, the drying unit 43 can smoothly dry the absorbing member 33 during the printing.

As illustrated in FIG. 5, the stop position P6 may be, for example, a position at which the ejecting unit 23 faces the wiping unit 37. In other words, the stop position P6 may coincide with the removal position P5. During the printing, the ejecting unit 23 may stop at the removal position P5 in order to remove the liquid adhering to the nozzle surface 25. In this case, during the printing, the drying unit 43 dries the absorbing member 33 by the ejecting unit 23 stopping at the removal position P5. Further, when the stop position P6 coincides with the removal position P5, the ejecting unit 23 may stand by at the removal position P5 for the specific processing. The drying unit 43 can dry the absorbing member 33 not only during the printing, but also when the ejecting unit 23 is wiped by the wiping unit 37 at the removal position P5 after the printing, for example. Therefore, when the stop position P6 coincides with the removal position P5, the drying unit 43 can dry the absorbing member 33 at the same time as the wiping unit 37 wiping the ejecting unit 23.

The ejecting unit 23 may stop at the stop position P6 not only during the printing, but also before the printing. In the ejecting unit 23, the specific processing may be performed not only during the printing, but also before the printing. In particular, the micro-vibrations need to be performed before the printing. This is because there is a high possibility that the thickening of the liquid in the nozzle 24 may be advanced due to an interval between printing operations. Thus, the ejecting unit 23 may stop at the stop position P6 before the printing and perform the micro-vibrations. The ejecting unit 23 may change the duration of the micro-vibrations performed before the printing, in accordance with the length of time that has elapsed from the previous flushing operation. For example, the longer the length of time that has elapsed from the previous flushing operation, the longer the length of time for which the ejecting unit 23 may perform the micro-vibrations before the printing. In this manner, when the ejecting unit 23 stops at the stop position P6 for the specific processing before the printing, the drying unit 43 can dry the absorbing member 33 at the same time as the specific processing being performed before the printing.

Operations and Effects

Next, operations and effects of the embodiment described above will be described.

(1) When the ejecting unit 23 is positioned at the stop position P6 during the printing, the drying unit 43 dries the absorbing member 33.

According to the configuration described above, by the drying unit 43 drying the absorbing member 33, the amount of liquid that can be absorbed by the absorbing member 33 is increased. Therefore, the consumed amount of the absorbing member 33 is reduced. Further, since the drying unit 43 that dries the medium 99 dries the absorbing member 33, it is not necessary to separately provide an additional configuration for drying the absorbing member 33.

(2) The stop position P6 is the position at which the distance between the drying unit 43 and the receiving unit 32 is smaller than when the ejecting unit 23 is positioned at the position facing the support portion 17.

When the ejecting unit 23 is positioned at the stop position P6, the drying unit 43 is closer to the receiving unit 32 than when the ejecting unit 23 is positioned at the position facing the support portion 17. Therefore, according to the configuration described above, the drying unit 43 can effectively dry the absorbing member 33.

(3) The stop position P6 is the position at which the ejecting unit 23 performs the micro-vibrations during the printing.

The ejecting unit 23 stirs the liquid in the nozzle 24 by generating the micro-vibrations. The micro-vibrations reduce the risk of the liquid in the nozzle 24 thickening. According to the configuration described above, the drying unit 43 dries the absorbing member 33 as a result of the ejecting unit 23 generating the micro-vibrations during the printing. In other words, the drying unit 43 dries the absorbing member 33 at the same time as the micro-vibrations being performed during the printing. In this manner, the drying unit 43 can smoothly dry the absorbing member 33.

(4) Before the printing, the ejecting unit 23 stops at the stop position P6 and performs the micro-vibrations.

According to the above configuration, the drying unit 43 dries the absorbing member 33 at the same time as the micro-vibrations being performed before the printing. In this manner, the drying unit 43 can smoothly dry the absorbing member 33.

(5) The stop position P6 is the position at which the carriage 22 turns back during the printing.

According to the configuration described above, the drying unit 43 dries the absorbing member 33 at the same time as the carriage 22 turning back. In this manner, the drying unit 43 can smoothly dry the absorbing member 33.

(6) The stop position P6 is the position at which the ejecting unit 23 faces the wiping unit 37.

According to the configuration described above, when the ejecting unit 23 is positioned at the stop position P6, the wiping unit 37 can wipe the nozzle surface 25. In other words, the drying unit 43 dries the absorbing member 33 at the same time as the wiping unit 37 wiping the nozzle surface 25. In this manner, the drying unit 43 can smoothly dry the absorbing member 33.

(7) When the ejecting unit 23 stops at the stop position P6, the air blowing unit 44 blows the air onto the absorbing member 33.

According to the configuration described above, by the air blowing unit 44 blowing the air onto the absorbing member 33, the drying unit 43 can effectively dry the absorbing member 33.

(8) The air blowing unit 44 increases the air blowing amount when the ejecting unit 23 stops at the stop position P6 after performing the cleaning operation, compared to when the ejecting unit 23 stops at the stop position P6 after performing the flushing operation.

In general, the amount of liquid received by the receiving portion 32 as a result of the cleaning operation is larger than the amount of liquid received by the receiving portion 32 as a result of the flushing operation. Thus, when the cleaning operation is performed, the amount of liquid absorbed by the absorbing member 33 is larger than that when the flushing operation is performed. According to the configuration described above, when the cleaning operation is performed, the drying of the absorbing member 33 is boosted as a result of the air blowing unit 44 increasing the air blowing amount. Therefore, the drying unit 43 can effectively dry the absorbing member 33 in accordance with the amount of liquid absorbed by the absorbing member 33.

(9) The contact portion 42 comes into contact with the nozzle surface 25 when the ejecting unit 23 is positioned at the retracted position P3. When the printing is not being performed, the ejecting unit 23 is positioned at the retracted position P3.

According to the configuration described above, the contact portion 24 comes into contact with the nozzle surface 25 to keep the nozzle 24 moisturized. In this manner, the risk of the nozzle 24 becoming clogged is reduced.

(10) When the ejecting unit 23 is positioned at the retracted position P3, the air blowing unit 44 blows the air onto the absorbing member 33.

According to the configuration described above, the drying unit 43 dries the absorbing member 33 at the same time as the contact portion 42 keeping the nozzle 24 moisturized. In this manner, the drying unit 43 can smoothly dry the absorbing member 33.

(11) When the ejecting unit 23 stops at the stop position P6, the heating unit 45 is positioned immediately above the absorbing member 33.

According to the configuration described above, the drying unit 43 dries the absorbing member 33 by the heating unit 45 heating the absorbing member 33.

(12) The main drying unit 21 is provided that dries the medium 99 after the printing.

According to the configuration described above, the drying of the medium 99 is promoted by the drying unit 43 drying the medium 99 during the printing and the main drying unit 21 drying the medium 99 after the printing.

MODIFIED EXAMPLES

The examples described above may be modified for implementation as follows. The examples described above and the following modified examples may be combined with each other for implementation in so far as they are not technically inconsistent.

The wiping unit 37 is not limited to a cloth wiper, and may be a blade wiper made of resin.

The liquid ejected by the ejecting unit 23 is not limited to ink, and may be, for example, a liquid material including particles of a functional material dispersed or mixed in liquid. For example, the ejecting unit 23 may eject a liquid material including, in a dispersed or dissolved form, a material such as an electrode material or a pixel material used in manufacture of a liquid crystal display, an electroluminescent (EL) display, and a surface emitting display.

Technical Concepts

Hereinafter, technical concepts and effects thereof that are understood from the above-described embodiment and modified examples will be described.

(A) A liquid ejecting device includes an ejecting unit including a nozzle surface at which at least one nozzle is open, the ejecting unit being configured to perform printing on a medium by ejecting a liquid onto the medium from the at least one nozzle, a carriage mounted with the ejecting unit and configured to reciprocate in a scanning direction, a drying unit mounted at the carriage and configured to dry the liquid ejected onto the medium by the ejecting unit, and a receiving unit configured to receive the liquid discharged from the at least one nozzle as a result of a maintenance operation for the ejecting unit. The receiving unit includes an absorbing member configured to absorb the liquid. The drying unit dries the absorbing member when the ejecting unit is positioned, during the printing, at a stop position at which the ejecting unit stops. According to the configuration described above, the drying unit dries the absorbing member to increase an amount of the liquid that can be absorbed by the absorbing member. Therefore, the consumed amount of the absorbing member is reduced.

(B) The liquid ejecting device described above may include a support portion configured to support the medium. The receiving unit may be arranged side by side with the support portion in the scanning direction. The stop position may be a position at which a distance between the drying unit and the receiving unit is smaller than when the ejecting unit is positioned at a position facing the support portion.

When the ejecting unit is positioned at the stop position, the drying unit comes closer to the receiving unit compared to when the ejecting unit is positioned at a position facing the support portion. Thus, according to the configuration described above, the drying unit can effectively dry the absorbing member.

(C) In the liquid ejecting device described above, the ejecting unit may be configured to perform micro-vibrations that vibrate the liquid in the at least one nozzle while not causing the liquid to be ejected from the at least one nozzle, and the stop position may be a position at which the ejecting unit performs the micro-vibrations during the printing.

The ejecting unit stirs the liquid in the nozzle by generating the micro-vibrations. The micro-vibrations reduce a risk of the liquid in the nozzle being thickened. According to the configuration described above, the drying unit dries the absorbing member as a result of the ejecting unit generating the micro-vibrations during the printing. In other words, the drying unit dries the absorbing member at the same time as the micro-vibrations being performed during the printing. In this manner, the drying unit can smoothly dry the absorbing member.

(D) In the liquid ejecting device described above, the ejecting unit may stop at the stop position and perform the micro-vibrations before the printing.

According to the configuration described above, the drying unit dries the absorbing member at the same time as the micro-vibrations being performed before the printing. In this manner, the drying unit can smoothly dry the absorbing member.

(E) In the liquid ejecting device described above, the stop position may be a position at which the carriage turns back during the printing.

According to the configuration described above, the drying unit dries the absorbing member at the same time as the carriage turning back. In this manner, the drying unit can smoothly dry the absorbing member.

(F) The liquid ejecting device described above may include a wiping unit configured to wipe the nozzle surface. The stop position may be a position at which the ejecting unit faces the wiping unit.

According to the configuration described above, when the ejecting unit is positioned at the stop position, the wiping unit can wipe the nozzle surface. In other words, the drying unit dries the absorbing member at the same time as the wiping unit wiping the nozzle surface. In this manner, the drying unit can smoothly dry the absorbing member.

(G) In the liquid ejecting device described above, the drying unit may include an air blowing unit configured to dry the medium by blowing air onto the medium, and the air blowing unit may blow the air onto the absorbing member when the ejecting unit stops at the stop position. According to the configuration described above, by the air blowing unit blowing the air onto the absorbing member, the drying unit can effectively dry the absorbing member.

(H) The liquid ejecting device described above may include a pressurizing unit configured to increase a pressure inside the ejecting unit. The ejecting unit may be configured to perform a flushing operation, as the maintenance operation, of causing the liquid to be ejected from the at least one nozzle and configured to perform a cleaning operation, as the maintenance operation, of causing the liquid to be forcibly discharged from the at least one nozzle by the pressurizing unit increasing the pressure inside the ejecting unit. The air blowing unit may increase an air blowing amount when the ejecting unit stops at the stop position after performing the cleaning operation, compared to when the ejecting unit stops at the stop position after performing the flushing operation.

In general, the amount of liquid received by the receiving portion as a result of the cleaning operation is larger than the amount of liquid received by the receiving portion as a result of the flushing operation. Thus, when the cleaning operation is performed, the amount of liquid absorbed by the absorbing member is larger than the amount of the liquid absorbed when the flushing operation is performed. According to the configuration described above, when the cleaning operation is performed, the air blowing unit increases the air blowing amount to boost the drying of the absorbing member. Therefore, the drying unit can effectively dry the absorbing member in accordance with the amount of liquid absorbed by the absorbing member.

(I) The liquid ejecting device described above may include a contact portion configured to form a space communicating with the at least one nozzle by coming into contact with the nozzle surface. The contact portion may come into contact with the nozzle surface when the ejecting unit is positioned at a retracted position different from the stop position. The ejecting unit may be positioned at the retracted position when not performing the printing. According to the configuration described above, the contact portion comes into contact with the nozzle surface to keep the nozzle moisturized. In this manner, a risk of the nozzle becoming clogged is reduced.

(J) In the liquid ejecting device described above, the air blowing unit may blow the air onto the absorbing member when the ejecting unit is positioned at the retracted position.

According to the configuration described above, the drying unit dries the absorbing member at the same time as the contact portion keeping the nozzle moisturized. In this manner, the drying unit can smoothly dry the absorbing member.

(K) In the liquid ejecting device described above, the drying unit may include a heating unit configured to dry the medium by heating the medium, and the heating unit may be positioned immediately above the absorbing member when the ejecting unit stops at the stop position. According to the configuration described above, the drying unit dries the absorbing member by the heating unit heating the absorbing member.

(L) The liquid ejecting device described above may include a main drying unit configured to dry the medium after the printing.

According to the configuration described above, the drying of the medium is boosted by the drying unit drying the medium during the printing and the main drying unit drying the medium after the printing.

What is claimed is:

1. A liquid ejecting device comprising:

an ejecting unit including a nozzle surface at which at least one nozzle is open, the ejecting unit being configured to perform printing on a medium by ejecting a liquid onto the medium from the at least one nozzle;

a carriage mounted with the ejecting unit and configured to reciprocate in a scanning direction;

a drying unit mounted at the carriage and configured to dry the liquid ejected onto the medium by the ejecting unit; and a receiving unit configured to receive the liquid discharged from the at least one nozzle as a result of a maintenance operation for the ejecting unit, wherein the receiving unit includes an absorbing member configured to absorb the liquid, the drying unit dries the absorbing member when the ejecting unit is positioned, during the printing, at a stop position at which the ejecting unit stops, the drying unit includes an air blowing unit configured to dry the medium by blowing air onto the medium, and the air blowing unit blows the air onto the absorbing member when the ejecting unit stops at the stop position.

2. The liquid ejecting device according to claim 1, further comprising a support portion configured to support the medium, wherein the receiving unit is arranged side by side with the support portion in the scanning direction and the stop position is a position at which a distance between the drying unit and the receiving unit is smaller than when the ejecting unit is positioned at a position facing the support portion.

3. The liquid ejecting device according to claim 1, wherein the ejecting unit is configured to perform micro-vibrations that vibrate the liquid in the at least one nozzle while not causing the liquid to be ejected from the at least one nozzle and the stop position is a position at which the ejecting unit performs the micro-vibrations during the printing.

4. The liquid ejecting device according to claim 3, wherein the ejecting unit stops at the stop position and performs the micro-vibrations before the printing.

5. The liquid ejecting device according to claim 1, wherein the stop position is a position at which the carriage turns back during the printing.

6. The liquid ejecting device according to claim 1, further comprising a wiping unit configured to wipe the nozzle surface, wherein the stop position is a position at which the ejecting unit faces the wiping unit.

7. The liquid ejecting device according to claim 1, further comprising a pressurizing unit configured to increase a pressure inside the ejecting unit, wherein the ejecting unit is configured to perform a flushing operation, as the maintenance operation, of causing the liquid to be ejected from the at least one nozzle and configured to perform a cleaning operation, as the maintenance operation, of causing the liquid to be forcibly discharged from the at least one nozzle by the pressurizing unit increasing the pressure inside the ejecting unit and the air blowing unit increases an air blowing amount when the ejecting unit stops at the stop position after performing the cleaning operation, compared to when the ejecting unit stops at the stop position after performing the flushing operation.

8. The liquid ejecting device according to claim 1, further comprising a contact portion configured to form a space communicating with the at least one nozzle by coming into contact with the nozzle surface, wherein the contact portion comes into contact with the nozzle surface when the ejecting unit is positioned at a retracted position different from the stop position and the ejecting unit is positioned at the retracted position when not performing the printing.

9. The liquid ejecting device according to claim 8, wherein the air blowing unit blows the air onto the absorbing member when the ejecting unit is positioned at the retracted position.

10. The liquid ejecting device according to claim 1, wherein the drying unit includes a heating unit configured to dry the medium by heating the medium and the heating unit is positioned immediately above the absorbing member when the ejecting unit stops at the stop position.

11. The liquid ejecting device according to claim 1, further comprising a main drying unit configured to dry the medium after the printing.

12. A liquid ejecting device comprising:

an ejecting unit including a nozzle surface at which at least one nozzle is open, the ejecting unit being configured to perform printing on a medium by ejecting a liquid onto the medium from the at least one nozzle;

a carriage mounted with the ejecting unit and configured to reciprocate in a scanning direction;

a drying unit mounted at the carriage and configured to dry the liquid ejected onto the medium by the ejecting unit; and a receiving unit configured to receive the liquid discharged from the at least one nozzle as a result of a maintenance operation for the ejecting unit, wherein the receiving unit includes an absorbing member configured to absorb the liquid, the drying unit dries the absorbing member when the ejecting unit is positioned, during the printing, at a stop position at which the ejecting unit stops, the drying unit includes a heating unit configured to heat the medium, and the heating unit heats the absorbing member when the ejecting unit stops at the stop position.

13. The liquid ejecting device according to claim 12, further comprising a support portion configured to support the medium, wherein the receiving unit is arranged side by side with the support portion in the scanning direction and the stop position is a position at which a distance between the drying unit and the receiving unit is smaller than when the ejecting unit is positioned at a position facing the support portion.

14. The liquid ejecting device according to claim 12, wherein the ejecting unit is configured to perform micro-vibrations that vibrate the liquid in the at least one nozzle while not causing the liquid to be ejected from the at least one nozzle and the stop position is a position at which the ejecting unit performs the micro-vibrations during the printing.

15. The liquid ejecting device according to claim 14, wherein the ejecting unit stops at the stop position and performs the micro-vibrations before the printing.

16. The liquid ejecting device according to claim 12, wherein the stop position is a position at which the carriage turns back during the printing.

* * * * *